(12) United States Patent
To et al.

(10) Patent No.: US 11,722,027 B2
(45) Date of Patent: Aug. 8, 2023

(54) ROTOR FOR AN AXIAL FLUX MOTOR, A RADIAL FLUX MOTOR, AND A TRANSVERSAL FLUX MOTOR

(71) Applicant: GKN Sinter Metals Engineering GmbH, Radevormwald (DE)

(72) Inventors: Hong Giang To, Düsseldorf (DE); Nils Bornemann, Bonn (DE); Stefan Tiller, Sankt Augustin (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 69 days.

(21) Appl. No.: 16/763,463

(22) PCT Filed: Nov. 16, 2018

(86) PCT No.: PCT/EP2018/081567
§ 371 (c)(1),
(2) Date: May 12, 2020

(87) PCT Pub. No.: WO2019/096997
PCT Pub. Date: May 23, 2019

(65) Prior Publication Data
US 2020/0295610 A1    Sep. 17, 2020

(30) Foreign Application Priority Data
Nov. 17, 2017   (DE) .................... 10 2017 127 157.0

(51) Int. Cl.
*H02K 1/27*    (2022.01)
*H02K 1/2793*    (2022.01)
(Continued)

(52) U.S. Cl.
CPC ............. *H02K 1/2793* (2013.01); *H02K 1/02* (2013.01); *H02K 1/2773* (2013.01); *H02K 2213/03* (2013.01)

(58) Field of Classification Search
None
See application file for complete search history.

(56) References Cited

U.S. PATENT DOCUMENTS 8,330,316 B2   12/2012   Petro et al.
9,246,364 B2   1/2016   Brahmavar et al.
(Continued)

FOREIGN PATENT DOCUMENTS

CN   103762758 A   4/2014
CN   105375655 A   3/2016
(Continued)

OTHER PUBLICATIONS

Machine Translation of EP 3073622 A1 (Year: 2016).*
(Continued)

*Primary Examiner* — Naishadh N Desai
(74) *Attorney, Agent, or Firm* — Quarles & Brady LLP (57) ABSTRACT

A rotor for an axial flux motor, a radial flux motor, or a transversal flux motor, has a rotational axis which extends along an axial direction. The rotor extends in an annular manner and has a plurality of permanent magnets along the circumferential direction, the magnetization of each magnet being oriented in the circumferential direction, wherein the permanent magnets are mutually spaced along the circumferential direction, and at least one soft magnetic composite as a first material is arranged between the permanent magnets.

12 Claims, 6 Drawing Sheets

(51) Int. Cl.
*H02K 1/02* (2006.01)
*H02K 1/276* (2022.01)

(56) References Cited

U.S. PATENT DOCUMENTS

| | | | | |
|---|---|---|---|---|
| 2005/0127769 | A1* | 6/2005 | Minagawa | H02K 1/2793 310/156.32 |
| 2008/0036331 | A1 | 2/2008 | Mizutani et al. | |
| 2014/0021818 | A1 | 1/2014 | Shibata | |
| 2014/0103770 | A1* | 4/2014 | Brahmavar | H02K 1/16 29/596 |
| 2015/0244219 | A1 | 8/2015 | Woolmer | |
| 2018/0219442 | A1* | 8/2018 | Heins | H02K 1/2793 |

FOREIGN PATENT DOCUMENTS

| | | | | |
|---|---|---|---|---|
| CN | 206432791 | U | 8/2017 | |
| DE | 102009021703 | B4 | 8/2013 | |
| DE | 102014222655 | A1 * | 5/2016 | H01F 3/02 |
| DE | 102015214893 | A1 * | 2/2017 | |
| DE | 102015214893 | A1 | 2/2017 | |
| EP | 3073622 | A1 * | 9/2016 | H02K 11/215 |
| JP | 2012249347 | A | 12/2012 | |
| JP | 2014023393 | A | 2/2014 | |
| JP | 2015027160 | A | 2/2015 | |
| JP | 2017042007 | A | 2/2017 | |
| JP | 2017060376 | A | 3/2017 | |
| WO | 2016066714 | A2 | 5/2016 | |

OTHER PUBLICATIONS

Machine Translation of DE 102014222655 A1 (Year: 2016).*
Machine Translation of DE 102015214893 A1 (Year: 2017).*
PCT International Search Report and Written Opinion, PCT/EP2018/081567, dated Feb. 13, 2019, 17 pages.
European Patent Office, Office Action, Application No. 18804591.8, dated Mar. 2, 2022, 7 pages [English Language Translation Unavailable].
The State Intellectual Property Office of People's Republic of China, First Office Action and Search Report, Application No. 201880074089.2, dated Feb. 17, 2022, 15 pages.
Intellectual Property India, Examination Report, Application No. 202017020001, dated Mar. 28, 2022, 8 pages.
Japan Patent Office, Notice of Reasons for Rejection, Application No. 2020-526970, dated May 31, 2022, 11 pages.

* cited by examiner

ROTOR FOR AN AXIAL FLUX MOTOR, A RADIAL FLUX MOTOR, AND A TRANSVERSAL FLUX MOTOR

This application represents the U.S. national stage entry of International Application No. PCT/EP2018/081567 filed Nov. 16, 2018, which claims priority to German Patent Application No. 10 2017 127 157.0 filed Nov. 17, 2017, the disclosure of which is incorporated herein by reference in its entirety and for all purposes.

The invention relates to a rotor for an electric drive, in particular for an axial flux motor (AFM), a radial flux motor and a transversal flux motor. In particular, different rotors are intended to be proposed for the individual types of electric drives.

Electric drives may be used as a generator and as an electric machine. Electric drives generally comprise a stator and a rotor which are arranged coaxially with respect to each other. The rotor is in this instance referred to as the carrier of permanent magnets, whilst the stator has a coil arrangement.

The rotor or the stator may be connected to a shaft which is driven by means of the electric drive (operation as an electric machine) or which transmits a rotational movement to the axial flux motor (generator operation). The basic structure of this electric drive may be presumed to be known. In this instance, the specific structure of a rotor is described.

In an axial flux motor, the rotor and stator are in particular arranged one behind the other in the axial direction. In this instance, differently magnetized magnets are arranged alternately in the peripheral direction on the rotor. The magnetic field lines of an axial flux motor extend substantially parallel with the rotation axis in an axial direction, the magnetic field is thus orientated substantially parallel with the rotation axis.

An electric axial flux machine is known, for example, from DE 10 2009 021 703 B4.

In a radial flux motor, the rotor and stator are arranged in particular in a radial direction one behind the other (that is to say, for example, rotor internally and stator externally or vice versa). In this instance, differently magnetized magnets are arranged in a peripheral direction alternately on the rotor. The magnetic field lines of a radial flux motor extend substantially transversely relative to the rotation axis in a radial direction, the magnetic field is thus orientated substantially transversely relative to the rotation axis.

Transversal flux motors generally comprise a stator and a rotor. The rotor and stator are in particular arranged in a radial direction one behind the other (that is to say, for example, rotor internally and stator externally or vice versa). In this instance, differently magnetized magnets are arranged alternately in the peripheral direction on the rotor. The magnetic field lines of a transversal flux motor extend substantially parallel with the rotation axis in an axial direction, the magnetic field is thus orientated substantially parallel with the rotation axis. The magnetic flux also extends in this instance three-dimensionally in a radial direction and in a peripheral direction.

The structure of a claw-pole stator of a transversal flux motor is explained below by way of example. Two claw-pole stators are arranged beside each other in the axial direction, wherein they contact each other over the end faces thereof. Each claw-pole stator has a large number of poles which extend from a base face in the axial direction. The first poles of the first claw-pole stator and second poles of the second claw-pole stator are arranged alternately in the peripheral direction and adjacent to each other so as to overlap each other in the axial direction, but spaced apart from each other. The poles may be arranged on the inner peripheral face or on the outer peripheral face. The claw-pole stators then contact each other via the end faces on the outer peripheral face or on the inner peripheral face. In the intermediate space of the claw-pole stators, in the axial direction between the end faces and in the radial direction between the mutually contacting end faces and the poles, a coil may be arranged so as to extend in the peripheral direction between the claw-pole stators.

An electric machine with cores of soft magnetic composite (SMC) is known from WO 2016/066714 A1. The permanent magnets used therein in the rotor are magnetized in a direction parallel with the rotation axis, that is to say, in the axial direction, that is to say, the flux lines of the magnetic field are discharged in an axial direction from the respective permanent magnets.

The coil arrangement of a stator has cores, for example, of SMC, which are surrounded by current-carrying windings. Each core may be an element which is arranged in order to be magnetized when a current is conducted through current-carrying windings around the core. The current-carrying windings may be formed as coils. Each coil may have an inner diameter which is substantially equal to an outer diameter of each core.

SMC is in particular formed by iron powder particles which are electrically insulated from each other. Iron losses in SMC particles in an electrical alternating field are generally low. In this respect, it therefore appears to be desirable to use SMC in electric machines at least partially in place of the most frequently used steel lamination (steel sheets or electric steel). In order to form a component from SMC, the particles are compressed and hardened. The SMC material is in this instance not sintered. Instead, there is carried out a tempering to below a melting temperature, which is, however, sufficient for the material to permanently keep the intended geometry.

The rotor of the electric drive (that is to say, the axial flux electric drive, of the radial flux motor and the transversal flux motor) may have permanent magnets or also soft-magnetic elements, for example, in recesses. Thus, using permanent magnets as an electric drive (in particular an axial flux electric motor, a radial flux electric motor or a transversal flux electric motor), a permanently excited synchronous or brushless direct-current motor (BLDC for short) can be formed, whilst, for example, using soft magnetic elements, a reluctance motor can be provided as an electric motor of the axial, radial or transversal type.

There is a constant requirement to increase the power capacity of electric machines.

Based on this, an object of the present invention is to at least partially solve the problems set out with respect to the prior art. In particular, a rotor for an electric drive (for an axial flux motor, a radial flux motor and a transversal flux motor) which has a higher level of efficiency is intended to be proposed.

In order to solve this problem, a rotor according to the features of claim 1 is proposed. The dependent claims relate to advantageous developments. The features set out individually in the claims can be combined with each other in a technologically advantageous manner and can be supplemented by explanatory facts from the description and details from the Figures, wherein additional embodiments of the invention are set out.

A contribution is made to this by a rotor for an electric drive, in particular for an axial flux motor, a radial flux motor and/or a transversal flux motor, having a rotation axis which extends in an axial direction, wherein the rotor extends in an annular manner and has in a peripheral direction a large number of permanent magnets (the term also includes in this instance in particular soft magnetic elements). The permanent magnets are preferably differently magnetized alternately in the peripheral direction (first permanent magnets with a first magnetization and second permanent magnets with a second magnetization). The magnetization of the permanent magnets is orientated in each case in a peripheral direction, wherein the permanent magnets are arranged spaced apart from each other in the peripheral direction, wherein at least one soft magnetic composite is arranged as a first material between the permanent magnets.

In this instance, it is in particular proposed that the permanent magnets are not magnetized in an axial direction, but instead in a peripheral direction. That is to say, the (or a majority of the) flux lines of the magnetic field of a (each) permanent magnet are discharged (substantially) in a peripheral direction from the respective permanent magnet.

A first material which can serve to concentrate the flux lines (increase the flux density, reduction of the eddy current flux losses) is arranged between the permanent magnets.

The flux lines of the magnetic field which are discharged in a peripheral direction from the permanent magnets are in particular directed through the first material which is adjacent in a peripheral direction toward the adjacent magnet.

Particularly between the permanent magnets, an iron-containing material is further arranged as a second material.

Preferably, the second material is a sintered iron-containing material or an electric steel material.

In particular as a result of the combination of the first material and second material, iron losses as a result of electric eddy current losses which occur on the surfaces of the first material and/or the second material can be prevented or reduced.

Preferably, for the axial flux motor, the first material and the second material are arranged in layers and in this instance one behind the other in the axial direction. In particular, therefore, in the axial direction, firstly one material and then the other material are arranged.

In particular, for the radial flux motor and/or a transversal flux motor, the first material and the second material are arranged in layers and in this instance arranged one behind the other in a radial direction. In particular, therefore, in the radial direction, firstly one material and then the other material are arranged.

With the arrangement of the rotor on a stator in order to form an electric machine, the first material is arranged in particular in the direction toward the stator.

In particular for the radial flux motor and/or the transversal flux motor, the first material in the radial direction is arranged adjacent to a stator of the radial flux motor and the transversal flux motor. In particular, the second material is arranged with spacing with respect to the stator. In particular, the first material is arranged between the second material and the stator.

In particular, the first material and the second material have together in the axial direction an overall height for the axial flux motor, wherein the first material extends over a first height which is at least 10%, in particular at least 20%, preferably at least 40% of the overall height.

Preferably, the first material has a first height which is a maximum of 90%, in particular a maximum of 80%, of the overall height.

In particular, the first material and the second material together have in the radial direction an overall height for the radial flux motor and/or the transversal flux motor, wherein the first material extends over a first height which is at least 10%, in particular at least 20%, preferably at least 40%, of the overall height.

Preferably, the first material has a first height which is a maximum of 90%, in particular a maximum of 80%, of the overall height.

In particular, the permanent magnets for the axial flux motor have in the axial direction an extent which (substantially) corresponds to the overall height. In particular, the permanent magnets for the radial flux motor and/or the transverse flux motor have in the radial direction an extent which (substantially) corresponds to the overall height.

In particular, the permanent magnets extend in a radial direction at least partially (in particular completely) further outward than the first material (and where applicable than the second material).

In particular, the permanent magnets extend in a radial direction at least partially (in particular completely) further inward than the first material (and where applicable than the second material).

Furthermore, an electric drive is proposed in the form of an axial flux motor, a radial flux motor or a transversal flux motor, at least comprising a stator and the rotor which has already been described, wherein the stator has a large number of cores which are surrounded by coils.

In particular, the stator has a soft magnetic composite.

The number of cores (or coils) may be different from the number of permanent magnets.

The embodiments relating to the rotor apply equally to the electric drive (or to the axial flux motor, the radial flux motor and the transversal flux motor) and vice versa.

By way of precaution, it should be noted that the numerals used here ("first", "second" . . . ) serve primarily (only) to differentiate a plurality of identical objects or variables, that is to say, they in particular do not necessarily predetermine any dependency and/or sequence of these objects or variables. If a dependency and/or a sequence should be required, this is set out explicitly here or it becomes self-evident for the person skilled in the art when studying the specifically described embodiment.

The invention and the technical background are explained in greater detail below with reference to the Figures. It should be noted that the invention is not intended to be limited by the embodiments set out. In particular, as long as not explicitly set out otherwise, it is also possible to extract part-aspects of the content explained in the Figures and to combine them with other components and knowledge from the present description and/or Figures. In particular, it should be noted that the Figures and in particular the size relationships set out are only schematic. The same reference numerals refer to the same objects so that where applicable explanations from other Figures can be used in addition. In the drawings.

Figure 1:
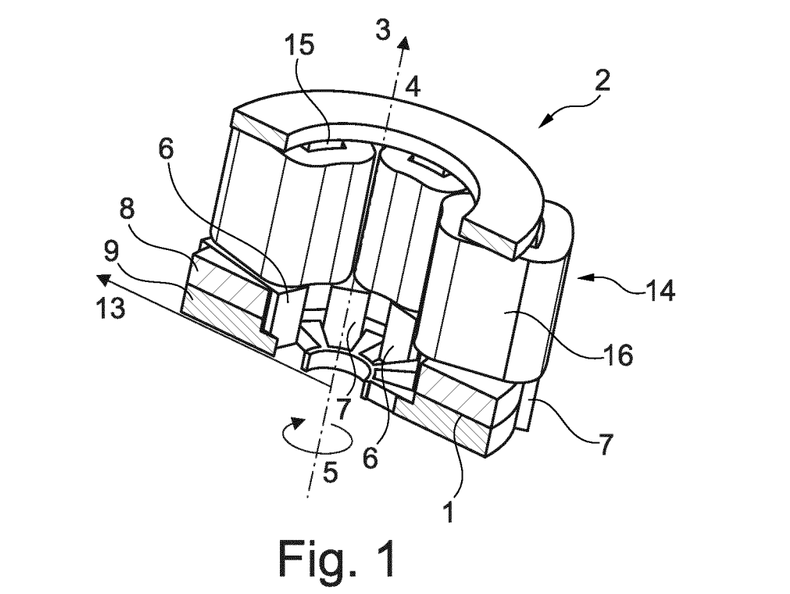
FIG. 1: is a perspective view of a first construction variant of an axial flux motor.

FIG. 1 is a perspective view of a first construction variant of an axial flux motor 2 having a rotation axis 4. The axial flux motor 2 comprises a stator 14 and a rotor 1, wherein the stator 14 has a large number of cores 15 which are surrounded by coils 16. The cores 15 are produced at least partially from the first material 8.

Figure 2:
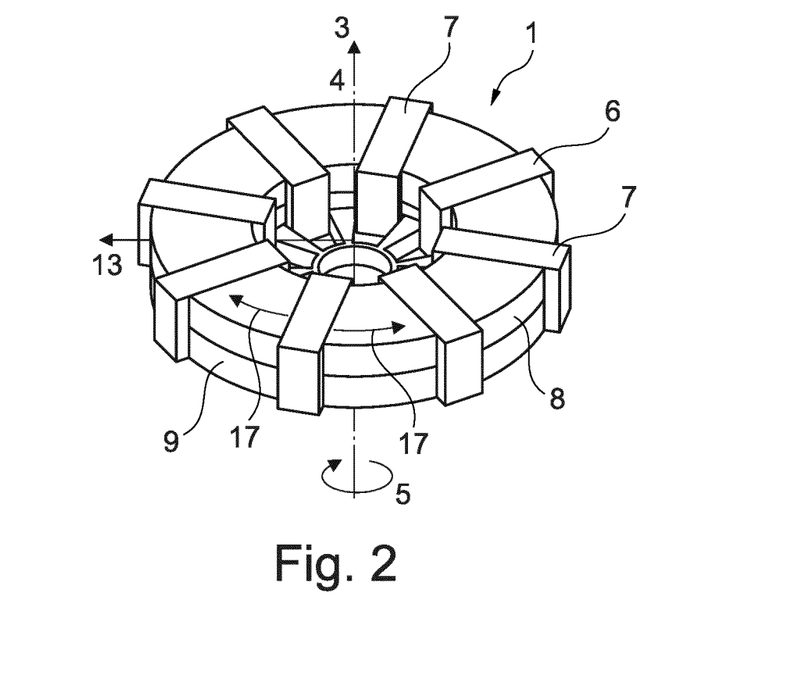
FIG. 2: is a perspective view of the rotor of the axial flux motor according to FIG. 1.
Figure 3:
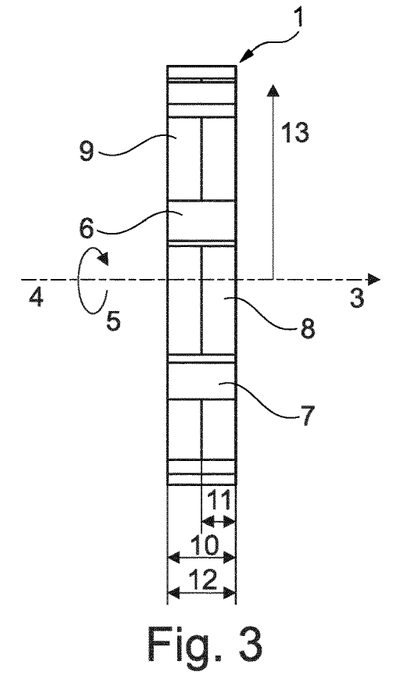
FIG. 3: is a side view of the rotor according to FIG. 2.
Figure 4:
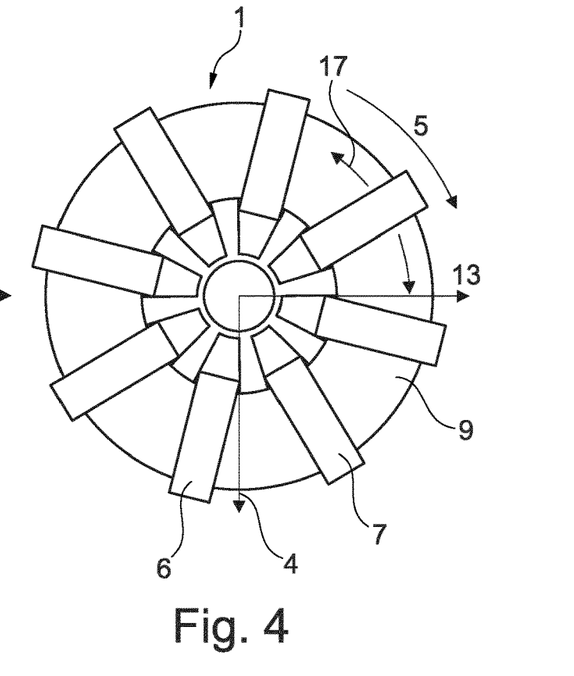
FIG. 4: shows the rotor according to FIGS. 2 and 3 in a view along the rotation axis.

FIG. 2 is a perspective view of the rotor 1 of the axial flux motor 2 according to FIG. 1. FIG. 3 is a side view of the rotor 1 according to FIG. 2. FIG. 4 shows the rotor 1 according to FIGS. 2 and 3 in a view along the rotation axis 4. FIGS. 2 to 4 are described together below.

The rotor 1 has a rotation axis 4 which extends in an axial direction 3, wherein the rotor 1 extends in an annular manner and has in a peripheral direction 5 a large number of first permanent magnets 6 (having a first magnetization) and second permanent magnets 7 (having a second magnetization which is different from the first magnetization). The permanent magnets 6, 7 are differently magnetized alternately in the peripheral direction 5. The magnetization of the permanent magnets 6, 7 is in each case orientated in a peripheral direction 5, that is to say, the direction of the flux lines 17 (when leaving or entering the permanent magnets) is orientated in the peripheral direction 5. The permanent magnets 6, 7 are arranged spaced apart from each other in the peripheral direction 5, wherein a soft magnetic composite is arranged between the permanent magnets 6, 7 as a first material 8.

An iron-containing material is further arranged between the permanent magnets 6, 7 as a second material 9. The first material 8 and the second material 9 are arranged in layers and in this instance in the axial direction 3 one behind the other. In the axial direction 3, the first material 8 and then the other material 9 are arranged.

The first material 8 and the second material 9 together have in the axial direction 3 an overall height 10, wherein the first material 8 extends over a first height 11, which is approximately 50% of the overall height 10.

The permanent magnets 6, 7 have in the axial direction 3 an extent 12 which corresponds to the overall height 10.

The permanent magnets 6, 7 extend in a radial direction 13 both further outward and further inward than the first material 8.

Figure 5:
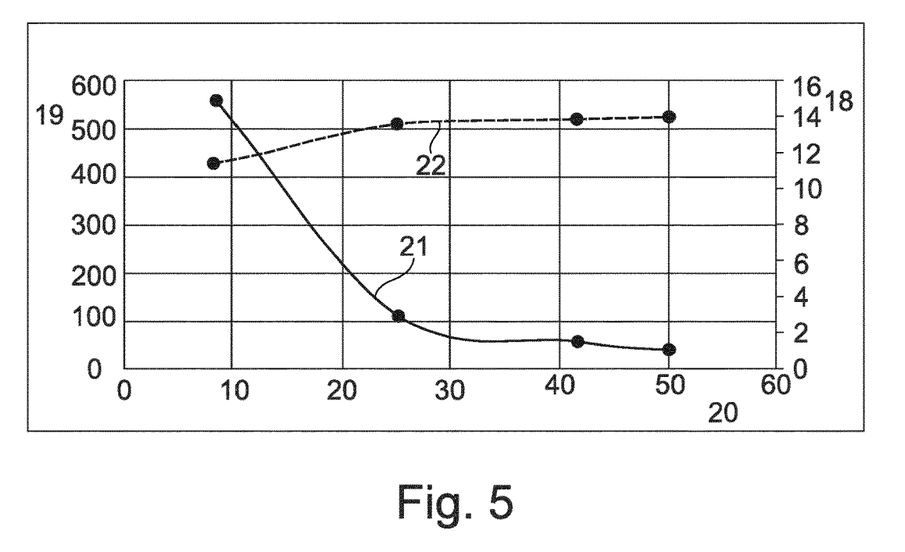
FIG. 5: is a graph in which eddy current losses and the torque which can be produced are illustrated in accordance with a distribution of the first material and second material.

FIG. 5 shows a graph which illustrates eddy current losses 18 [Watt] (vertical axis) and the torque 19 which can be produced [mNm] (Milli-Newton meter) (vertical axis) in accordance with a distribution of the first material and second material (ratio 20 of the first height 11 to overall height 10 [%]; horizontal axis).

The first line 21 shows the path of the eddy current losses 18 in accordance with the ratio 20. The second curve 22 shows the path of the torque 19 which can be achieved in accordance with the ratio 20.

Figure 6:
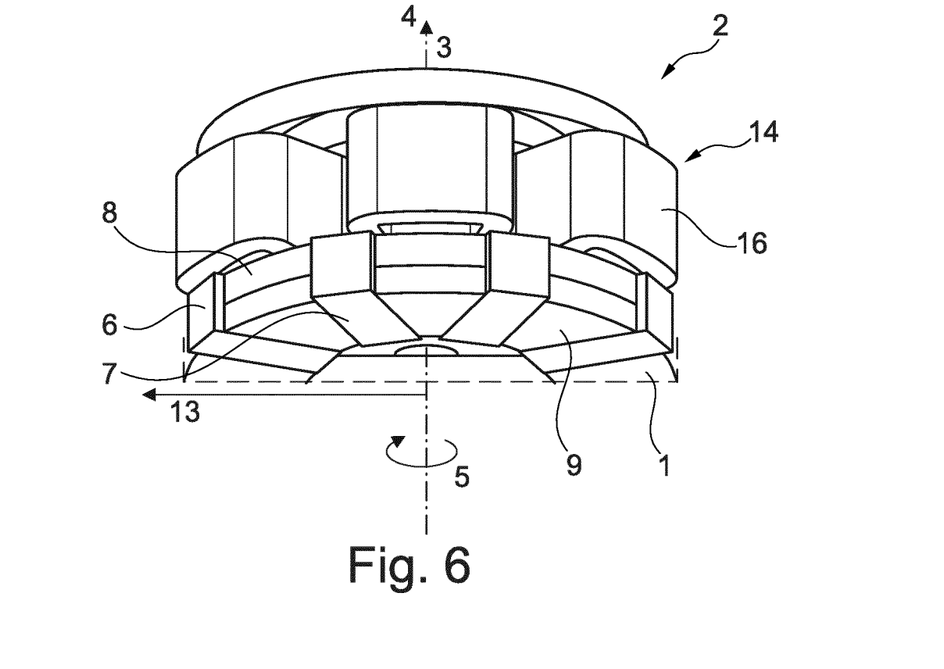
FIG. 6: is a first perspective view of a second construction variant of an axial flux motor.
Figure 7:
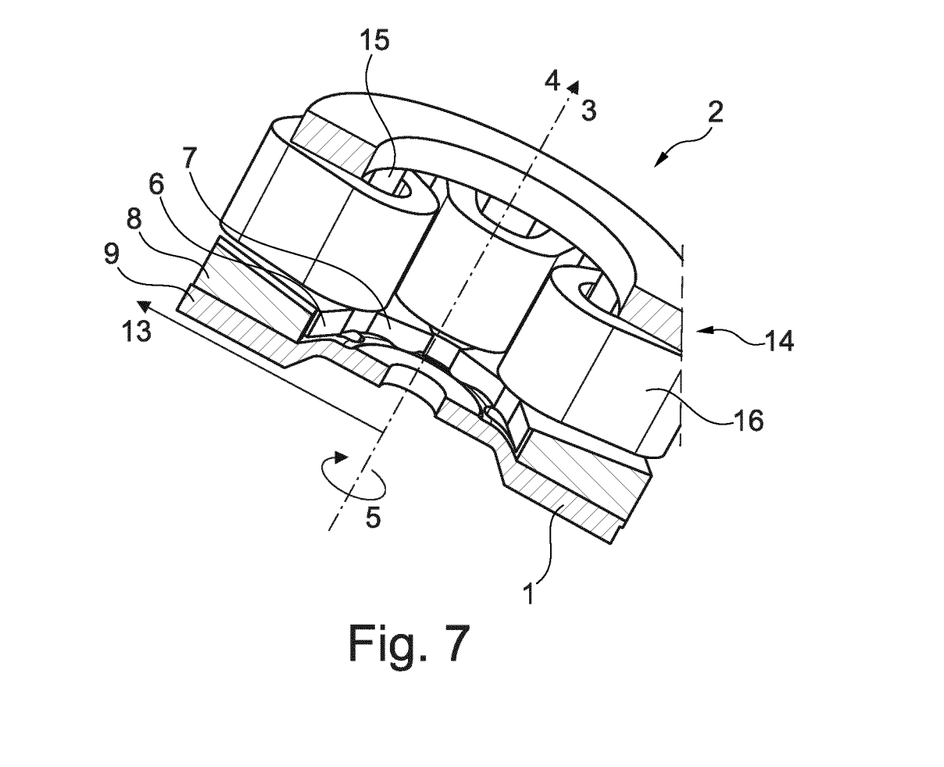
FIG. 7: is a second perspective view of the axial flux motor from FIG. 6.

FIG. 6 is a first perspective view of a second construction variant of an axial flux motor 2. FIG. 7 is a second perspective view of the axial flux motor 2. Reference may be made to the explanations relating to FIGS. 1 to 4.

In the axial flux motor 2, the rotor 1 and stator 14 are arranged one behind the other in the axial direction 3. In this instance, differently magnetized permanent magnets 6, 7 are arranged in the peripheral direction 5 alternately on the rotor 1. The magnetic field lines of an axial flux motor 2 extend substantially parallel with the rotation axis 4 in an axial direction 3, the magnetic field is thus orientated substantially parallel with the rotation axis 4.

Figure 8:
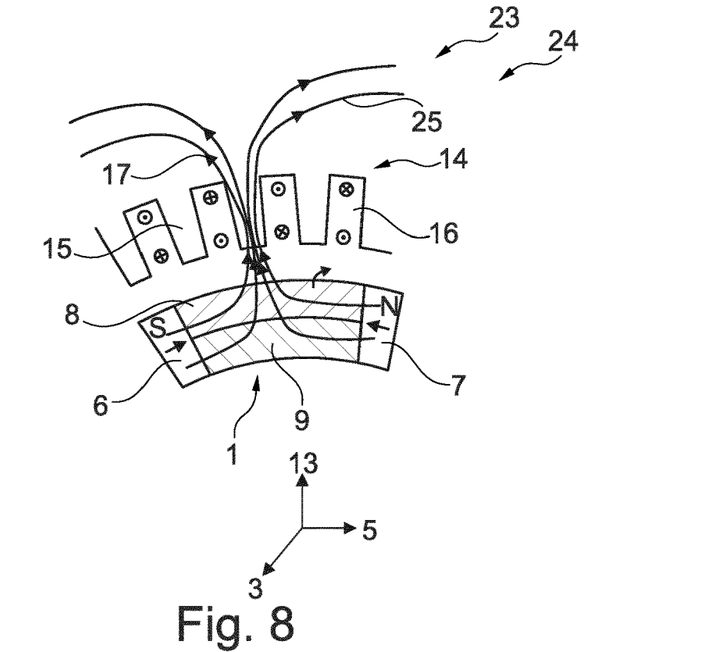
FIG. 8: shows a path of the magnetic flux in a radial flux motor and a transversal flux motor and a temporally varying magnetic field at one time.

FIG. 8 shows a path of the magnetic flux or the magnetic field lines 25 in a radial flux motor 23 and a transversal flux motor 24 and a temporally varying magnetic field at a time. The stator 14 is illustrated without coils 16, wherein the changing polarity of the time-variable magnetic field for a time is illustrated by the +/−symbol. The rotor 1 has a rotation axis 4 which extends in an axial direction 3, wherein the rotor 1 extends in an annular manner and has in a peripheral direction 5 a large number of first permanent magnets 6 (with a first magnetization) and second permanent magnets 7 (with a second magnetization which differs from the first magnetization). The permanent magnets 6, 7 are differently magnetized alternately in the peripheral direction 5. The magnetization of the permanent magnets 6, 7 is orientated in each case in the peripheral direction 5, that is to say, the direction of the flux lines 17 (when leaving or entering the permanent magnets) is orientated in the peripheral direction 5. The permanent magnets 6, 7 are arranged spaced apart from each other in the peripheral direction 5, wherein a soft magnetic composite is arranged between the permanent magnets 6, 7 in the radial direction 13 externally as a first material 8 and a second material 9 is arranged in the radial direction 13 internally.

Figure 9:
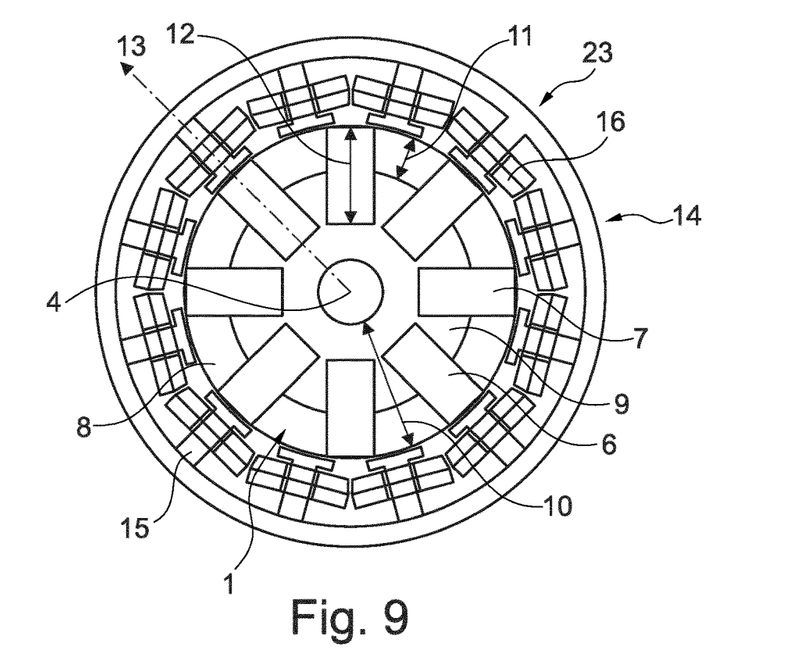
FIG. 9: is a side view of a radial flux motor from FIG. 8 along the rotation axis.
Figure 10:
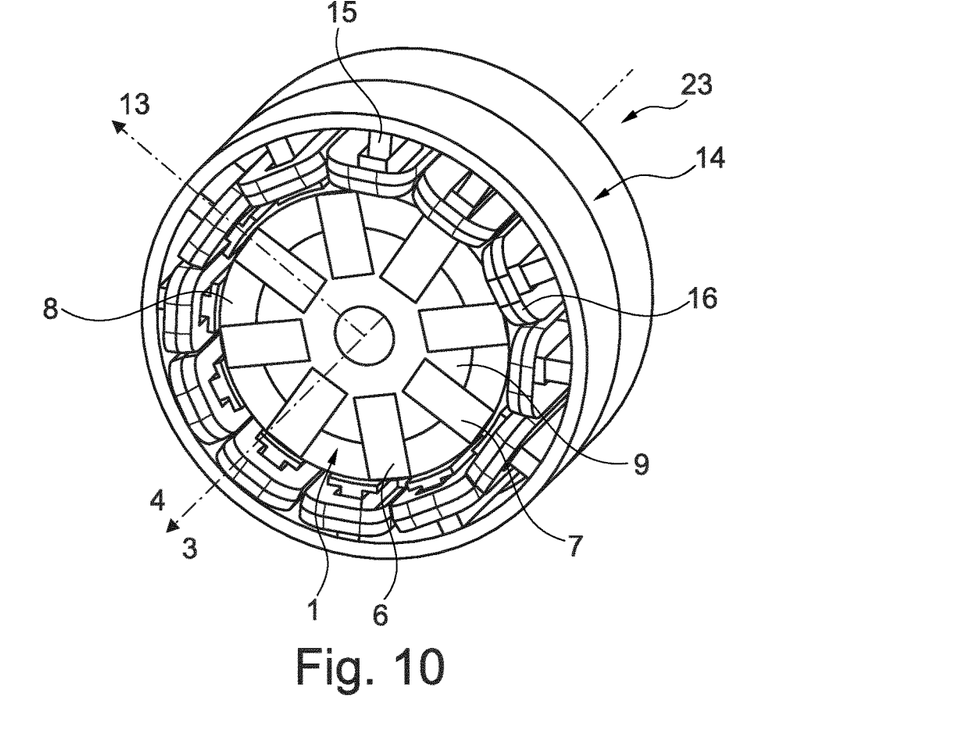
FIG. 10: is a perspective view of the radial flux motor according to FIG. 9.

FIG. 9 is a side view of a radial flux motor 23 along the rotation axis 4. FIG. 10 is a perspective view of the radial flux motor 23 according to FIG. 9. FIGS. 9 and 10 are described together below. Reference may be made to the statements relating to FIG. 8.

In a radial flux motor 23, the rotor 1 and stator 14 are arranged one behind the other in a radial direction 13 (that is to say, in this instance the rotor 1 internally and stator 14). In this instance, differently magnetized permanent magnets 6, 7 are arranged in the peripheral direction 5 alternately on the rotor 1. The magnetic field lines 25 of a radial flux motor 23 extend substantially transversely relative to the rotation axis 4 in a radial direction 13, the magnetic field is thus orientated substantially transversely with respect to the rotation axis 4.

For the radial flux motor 23, the first material 8 and the second material 9 are arranged in layers and in this instance in a radial direction 13 one behind the other. Starting internally and moving outwardly in the radial direction 13, first the second material 9 and then the first material 8 are arranged in this case.

In the arrangement of the rotor 1 on the stator 14, in order to form an electric machine the first material 8 is arranged in the direction toward the stator 14.

For the radial flux motor 23, the first material 8 is arranged in the radial direction 13 adjacent to the stator 14 of the radial flux motor 23. The second material 9 is arranged with spacing from the stator 14. The first material 8 is arranged between the second material 9 and the stator 14.

For the radial flux motor 23, the first material 8 and the second material 9 have together in the radial direction 13 an overall height 10, wherein the first material 8 extends over a first height 11.

Figure 11:
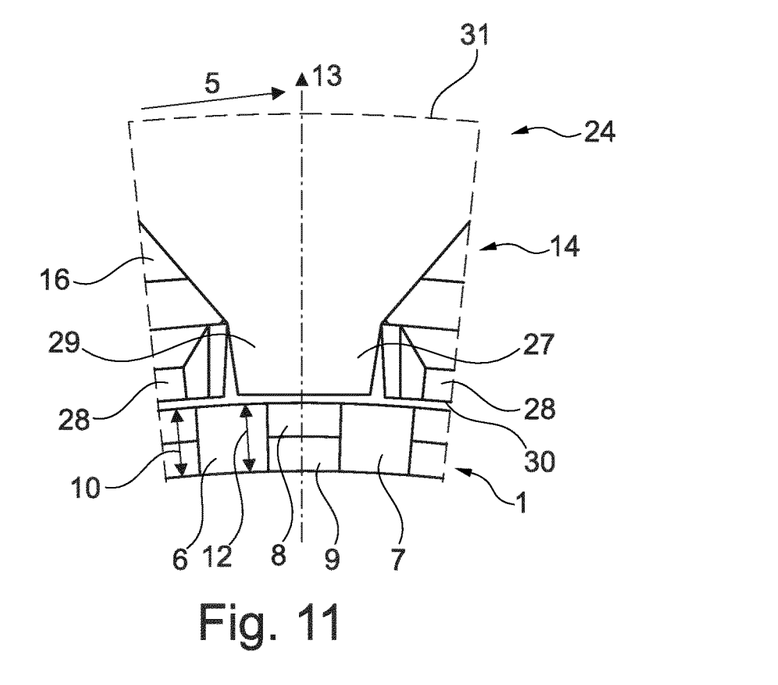
FIG. 11: shows a cut-out of a transversal flux motor as a side view along the rotation axis.
Figure 12:
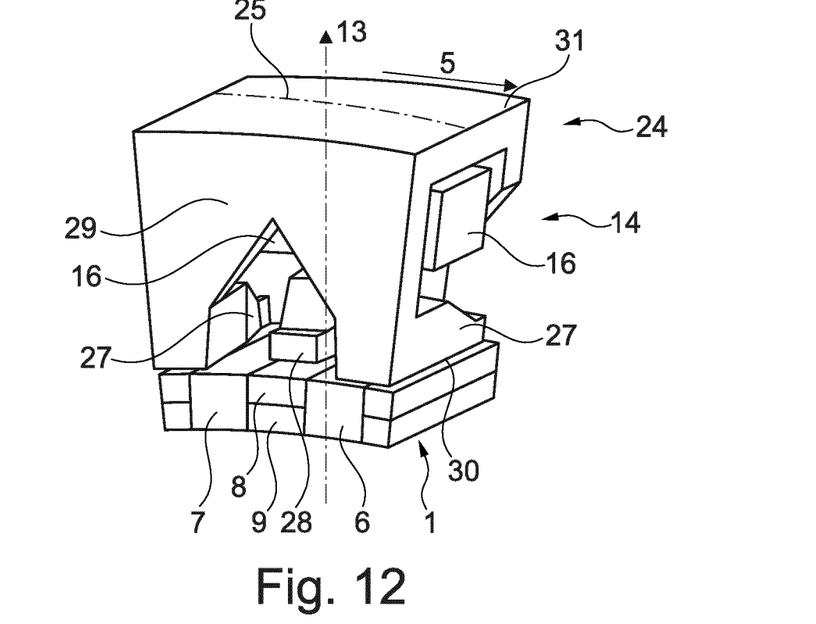
FIG. 12: is a first perspective view of the cut-out according to FIG. 11.
Figure 13:
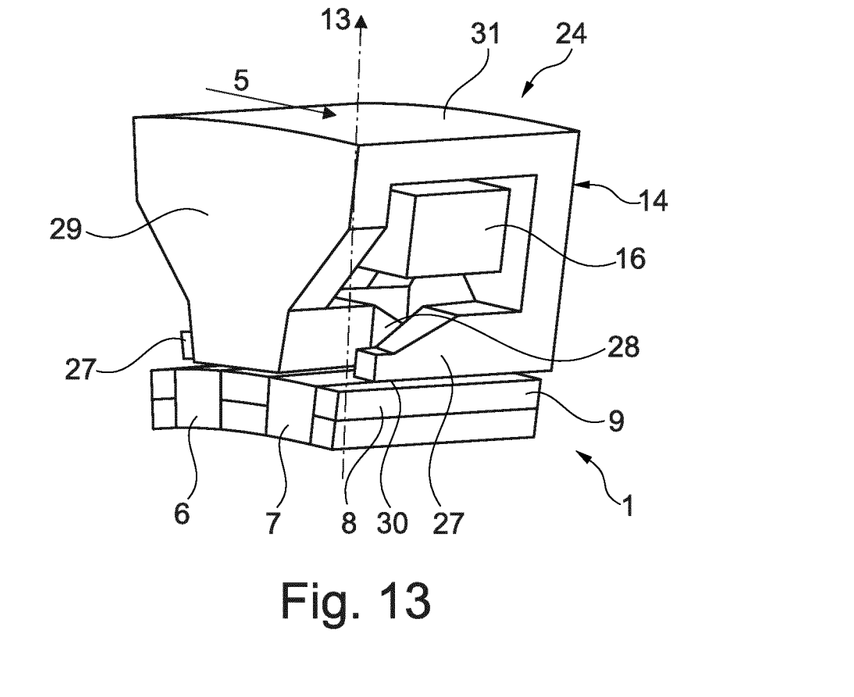
FIG. 13: is a second perspective view of the cut-out according to FIGS. 11 and 12.

FIG. 11 shows a cut-out of a transversal flux motor 24 as a side view about the rotation axis 4. FIG. 12 shows the cut-out according to FIG. 11 as a first perspective view. FIG. 13 shows the cut-out according to FIGS. 11 and 12 as a second perspective view. FIGS. 11 to 13 are described together below.

Transversal flux motors 24 generally comprise a stator 14 and a rotor 1. The rotor 1 and stator 14 are arranged one behind the other in a radial direction 13 (that is to say, in this instance the rotor 1 internally and stator 14 externally). In this instance, differently magnetized permanent magnets 6, 7 are arranged alternately in the peripheral direction 5 on the rotor 1. The magnetic field lines 25 of a transversal flux motor 24 extend substantially parallel with the rotation axis 4 in an axial direction 3, the magnetic field is thus orientated substantially parallel with the rotation axis 4. The magnetic flux also extends in this instance three-dimensionally in the radial direction 13 and in the peripheral direction 5.

For a claw-pole stator 14, two claw-pole stators 14 are arranged beside each other in the axial direction 3, wherein they contact each other via the end faces 25 (end faces 25 indicated in FIG. 12) or are already constructed in one piece (see FIG. 13). Each claw-pole stator 14 has a large number of poles 27, 28 which extend from a base face 29 in the axial direction 3. The first pole 27 of the first claw-pole stator 14 and second poles 28 of the second claw-pole stator 14 are arranged alternately in the peripheral direction 5 and in each case adjacent to each other and so as to overlap each other in the axial direction 3, but spaced apart from each other. The poles 27, 28 are arranged on the inner peripheral face 30. The claw-pole stators 14 contact each other via the end faces 25 on the outer peripheral face 31 (see FIG. 12 or are constructed in one piece, see FIG. 13). A coil 16 is arranged so as to extend in the peripheral direction 5 between the claw-pole stators 14 in the intermediate space of the claw-pole stators 14 in the axial direction 3 between the end faces 25 and in the radial direction 13 between the mutually contacting end faces 25 and the poles 27, 28.

For the transversal flux motor 24, the first material 8 and the second material 9 are arranged in layers and in this instance in a radial direction 13 one behind the other. In this instance, therefore, starting from the inner side and moving in the radial direction 13 externally, first the second material 9 and then the first material 8 are arranged.

When the rotor 1 is arranged on the stator 14, in order to form an electric machine the first material 8 is arranged in the direction toward the stator 14.

For the transversal flux motor 24, the first material 8 is arranged in the radial direction 13 adjacent to the stator 14 of the transversal flux motor 24. The second material 9 is arranged with spacing from the stator 14. The first material 8 is arranged between the second material 9 and the stator 14.

For the transversal flux motor 24, the first material 8 and the second material 9 have together in the radial direction 13 an overall height 10, wherein the first material 8 extends over a first height 11.

LIST OF REFERENCE SIGNS

1 Rotor
2 Axial flux motor
3 Axial direction
4 Rotation axis
5 Peripheral direction
6 First permanent magnet
7 Second permanent magnet
8 First material
9 Second material
10 Overall height
11 First height
12 Extent
13 Radial direction
14 Stator
15 Core
16 Coil
17 Direction of the flux lines
18 Eddy current loss [Watt]
19 Torque [mNm]
20 Ratio of first height/overall height [%]
21 First line
22 Second line
23 Radial flux motor
24 Transversal flux motor
25 Magnetic field line
26 End face
27 First pole
28 Second pole
29 Base face
30 Inner peripheral face
31 Outer peripheral face

The invention claimed is:

1. A rotor for an axial flux motor, a radial flux motor or a transversal flux motor, the rotor comprising a rotation axis which extends in an axial direction, wherein the rotor extends in an annular manner and has in a peripheral direction a large number of permanent magnets, the magnetization of which is orientated in each case in the peripheral direction, wherein the permanent magnets are arranged spaced apart from each other in the peripheral direction, wherein a first material at least comprising a soft magnetic composite is arranged between the permanent magnets, wherein a second material comprising an iron-containing material is further arranged between the permanent magnets, and wherein the second material is a sintered iron-containing material.

2. The rotor as claimed in claim 1, wherein for the axial flux motor the first material and the second material are arranged in layers and the layers are arranged one behind the other in the axial direction.

3. The rotor as claimed in claim 1, wherein for the axial flux motor the first material and the second material have together in the axial direction an overall height, wherein the first material extends over a first height which is at least 10% of the overall height.

4. The rotor as claimed in claim 3, wherein for the axial flux motor the permanent magnets have in the axial direction an extent which corresponds to the overall height.

5. The rotor as claimed in claim 1, wherein the permanent magnets extend in a radial direction at least partially further outward than the first material.

6. The rotor as claimed in claim 1, wherein the permanent magnets extend in a radial direction at least partially further inward than the first material.

7. The rotor as claimed in claim 1, wherein for the radial flux motor and the transversal flux motor the first material is arranged in the radial direction adjacent to a stator of the radial flux motor and the transversal flux motor.

8. An electric drive in the form of an axial flux motor, a radial flux motor or a transversal flux motor, the electric drive at least comprising a stator and a rotor as claimed in claim 1, wherein the stator has a number of cores which are surrounded by coils.

9. The electric drive as claimed in claim 8, wherein the stator has a soft magnetic composite.

10. The rotor as claimed in claim 1, wherein for the radial flux motor and the transversal flux motor the first material and the second material are arranged in layers and the layers are arranged in a radial direction one behind the other.

11. The rotor as claimed in claim 1, wherein for the radial flux motor and the transversal flux motor the first material and the second material together have an overall height in a radial direction, wherein the first material extends over a first height which is at least 10% of the overall height.

12. The rotor as claimed in claim 11, wherein for the radial flux motor and the transversal flux motor the permanent magnets have in the radial direction an extent which corresponds to the overall height.

\* \* \* \* \*